July 16, 1968   P. C. KING   3,392,673
CONSUMABLE PYROGEN IGNITER
Filed May 29, 1967

INVENTOR.
PAUL C. KING
BY
V. C. MULLER
ROY MILLER
ATTORNEYS.

United States Patent Office 3,392,673
Patented July 16, 1968

3,392,673
CONSUMABLE PYROGEN IGNITER
Paul C. King, China Lake, Calif., assignor to the United States of America as represented by the Secretary of the Navy
Filed May 29, 1967, Ser. No. 643,312
2 Claims. (Cl. 102—70)

ABSTRACT OF THE DISCLOSURE

Igniter is constructed similar to a solid propellant rocket motor with an exhaust nozzle designed to maintain the igniter combustion chamber at desired pressure. All, or substantially all, of the igniter is consumed, thus eliminating or materially reducing dead weight to be carried by the rocket which carries it.

The invention described herein may be manufactured and used by or for the Government of the United States of America for governmental purposes without the payment of any royalties thereon or therefor.

In the prior art, consumable solid propellant rocket motor igniters have been proposed, however, they are usually of the piccolo tube or basket type which deliver hot particles and gas radially toward the inner surface of the perforation of a rocket motor grain. Such a device is exemplified by the patent to Guay 3,017,836. In such devices the pressure within the igniter is substantially the same as the pressure within the combustion chamber of the rocket motor.

One of the objects of this invention is to provide a consumable rocket motor igniter in which the pressure within the igniter is controlled by an exhaust nozzle which maintains igniter combustion chamber pressure in excess of rocket motor combustion chamber pressure.

Another object is to exhaust hot particles and gas from the igniter in an optimum direction relative to the inner surface of the rocket motor grain.

Another object is to provide an igniter which is completely consumed, or substantially consumed, leaving a minimum amount of dead weight to be carried by the rocket motor.

A further object is to provide an igniter which is of simplified construction and subject of economical manufacture.

Figure 1:
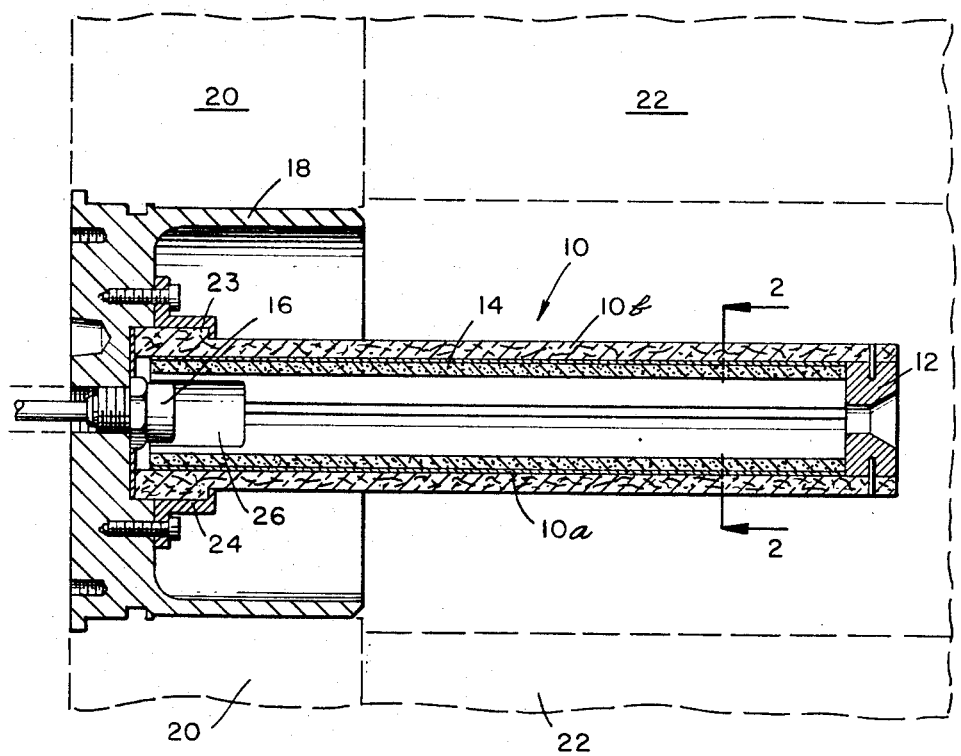
Figure 2:
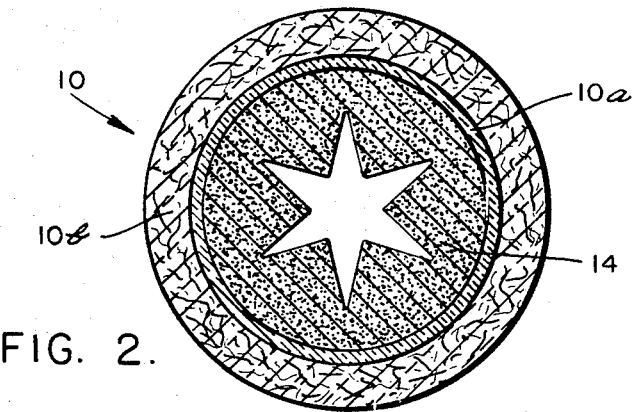

Still further objects, advantages, and salient features will become apparent from the description to follow, the appended claims, and the accompanying drawing, in which:

FIG. 1 is a longitudinal central section of the subject of the invention, its general environment in a rocket motor being shown in phantom; and FIG. 2 is an enlarged section taken on line 2—2, FIG. 1.

Referring now to the drawing, the subject of the invention comprises briefly, a tube 10, having an exhaust nozzle 12 at one end, a powder grain 14 disposed within the tube, and an electrically initiated squib 16 disposed at its opposite end, the tube being secured to a closure 18 which sealingly engages the forward end of a rocket motor 20 which contains a propellant grain 22 which is to be ignited.

Tube 10 is formed as an inner tube 10a of glass cloth which is formed on a mandrel and impregnated with a resin, such as Epon No. 815, to which a curing agent, such as catalyst A, has been added, and an outer tube 10b. The glass cloth may be lapped slightly or several turns may be employed, however, it should be of minimum wall thickness to minimize weight. No. 181 glass cloth which has a thickness of about .010″ has been found to be satisfactory.

After curing, birds eye cotton cloth, which has been impregnated with the resin curing agent and ammonium perchlorate powder is wound around the glass cloth tube to the desired thickness to reinforce it to withstand a desired internal pressure, forming tube 10b. Satisfactory proportions are about 10% curing agent and 10% ammonium perchlorate, both by weight of the weight of the resin. The ammonium perchlorate is preferably finely divided. After curing, the entire tube is machined to desired dimensions, where dimensions are critical for assembly purposes. As illustrated, the front end of the reinforced cloth is wound in additional layers to form a collar 23 which is received within a retaining cup 24 secured to the front closure.

The igniter grain is extruded in known manner, cured and cemented within the glass tube. In the particular construction illustrated a counterbore 26 is provided which surrounds a portion of the squib.

The nozzle may be formed of heat resistant phenolic material and may be secured within the glass tube in any suitable manner, such as by cement, pins or the like. The throat area of the nozzle must be proportioned to maintain a desired internal pressure in the igniter while its grain is burning. Preferably, the nozzle 12 diverges so that the products of combustion fan outwardly as they pass along the inner surface of the motor grain.

In the operation, the squib is initiated which initiates one or more booster charges contained in it, the products igniting the igniter grain which burns under pressure, as determined by the nozzle throat area. These pressures may vary between 300–1000 p.s.i. and rocket motor pressure may vary between 20–50 p.s.i. When the rocket motor grain ignites, the high temperature ignites the cotton cloth and its bonding resin, the ammonium perchlorate serving as the oxidizer. After this occurs, the glass cloth tube may remain as a thin charred shell or may disintegrate and be blown out of the rocket motor exhaust nozzle.

Obviously many modifications and variations of the present invention are possible in the light of the above teachings. It is therefore to be understood that within the scope of the appended claims the invention may be practiced otherwise than as specifically described.

What is claimed is:
1. In a rocket motor having a solid propellant with a longitudinal central perforation therein and an igniter for same, the improvements wherein said igniter comprises:
   (a) a relatively thin wall cylindrical tube secured to the front end of the motor and extending axially rearwardly within said perforation,
   (b) an elongated centrally perforate igniter powder grain disposed within and extending coextensive of the length of same, its perforation forming an igniter combustion chamber,
   (c) a squib at the forward end of the tube for igniting the igniter grain,
   (d) a relatively thick wall cylindrical reinforcing tube surrounding the thin wall tube consisting of combustible material impregnated with an oxidizer adapted to cause the reinforcing tube to be consumed during the burning of said solid propellant,
   (e) said thick wall tube extending rearwardly beyond the rear ends of the thin wall tube and powder grain to provide a nozzle receiving bore, and
   (f) a nozzle disposed within said bore having a divergent exhaust end and a throat of a size to main- tain a desired pressure within the igniter combustion chamber, (g) said nozzle being constructed of heat resistant non-consumable material, such as a phenolic material, for maintaining its throat of constant size during the burning of the powder grain.

2. Apparatus in accordance with claim 1 wherein said thick wall tube is provided with a circular collar at its front end of a diameter greater than the diameter of the remainder of same, and a cup shaped member surrounding said collar and secured to the rocket motor for retaining the igniter affixed thereto.

References Cited

UNITED STATES PATENTS

| | | | |
|---|---|---|---|
| 3,032,970 | 5/1962 | Fox | 60—35.6 |
| 3,098,444 | 7/1963 | Walkey et al. | 102—43 |
| 3,170,287 | 2/1965 | Adelman | 102—70 X |
| 3,286,472 | 11/1966 | Thurston | 60—256 |
| 3,293,056 | 12/1966 | Baker | 102—43 |

BENJAMIN A. BORCHELT, *Primary Examiner.*

G. H. GLANZMAN, *Assistant Examiner.*